US011187420B2

(12) United States Patent
Oakes, III et al.

(10) Patent No.: US 11,187,420 B2
(45) Date of Patent: Nov. 30, 2021

(54) PORTABLE MISTING SYSTEM

(71) Applicant: RATO Industry LLC, Spring, TX (US)

(72) Inventors: Thomas Ellis Oakes, III, Spring, TX (US); Robert Aguilar, Spring, TX (US)

(73) Assignee: RATO Industry LLC, Spring, TX (US)

( * ) Notice: Subject to any disclaimer, the term of this patent is extended or adjusted under 35 U.S.C. 154(b) by 189 days.

(21) Appl. No.: 16/487,724

(22) PCT Filed: Sep. 14, 2018

(86) PCT No.: PCT/US2018/051033
§ 371 (c)(1),
(2) Date: Aug. 21, 2019

(87) PCT Pub. No.: WO2019/055758
PCT Pub. Date: Mar. 21, 2019

(65) Prior Publication Data
US 2020/0041149 A1 Feb. 6, 2020

Related U.S. Application Data

(60) Provisional application No. 62/558,546, filed on Sep. 14, 2017.

(51) Int. Cl.
F24F 6/14 (2006.01)
F24F 13/20 (2006.01)

(52) U.S. Cl.
CPC ............... *F24F 6/14* (2013.01); *F24F 13/20* (2013.01); *F24F 2006/146* (2013.01); *F24F 2221/12* (2013.01)

(58) Field of Classification Search
CPC ........ F24F 6/14; F24F 13/20; F24F 2006/146; F24F 2221/12; Y02B 30/54
See application file for complete search history.

(56) References Cited

U.S. PATENT DOCUMENTS

| 5,979,793 | A  | * | 11/1999 | Louis    | A62C 13/66 239/128 |
| 6,189,805 | B1 |   | 2/2001  | West et al. |  |
| 6,237,896 | B1 | * | 5/2001  | Hicks    | F24F 6/14 261/28 |
| 8,496,232 | B1 | * | 7/2013  | Nelson   | F24F 5/0035 261/5 |
| 2005/0077391 | A1 | * | 4/2005 | Powell  | B05B 9/0423 239/373 |

(Continued)

OTHER PUBLICATIONS

ISR/WO associated with PCT/US2018/051033 and dated Jan. 2, 2019.

*Primary Examiner* — Kun Kai Ma
(74) *Attorney, Agent, or Firm* — Vorys, Sater, Seymour and Pease LLP

(57) ABSTRACT

A portable misting system includes a carrying case, a fluid pump arranged within the carrying case, and a power source arranged within the carrying case to provide electrical power to the fluid pump. A working fluid source provides a working fluid to the fluid pump via a supply line, a distribution line receives a pressurized working fluid from the fluid pump, and one or more spray nozzles are coupled to the distribution line to discharge the pressurized working fluid as a mist.

18 Claims, 4 Drawing Sheets

(56) References Cited

U.S. PATENT DOCUMENTS

| | | | |
|---|---|---|---|
| 2005/0082390 A1* | 4/2005 | Ferrono | B60H 1/00264 |
| | | | 239/332 |
| 2006/0032259 A1 | 2/2006 | White | |
| 2006/0254667 A1* | 11/2006 | Mariani | F24F 5/0035 |
| | | | 141/9 |
| 2009/0265977 A1* | 10/2009 | Sullivan | A01M 7/0021 |
| | | | 43/132.1 |
| 2011/0180625 A1* | 7/2011 | Rotondo | F24F 6/14 |
| | | | 239/152 |
| 2013/0181062 A1* | 7/2013 | Zimmer | B05B 7/0081 |
| | | | 239/8 |

* cited by examiner

PORTABLE MISTING SYSTEM

BACKGROUND

Personal misting devices and systems are used to provide a personalized cooling effect to a user. In operation, such devices issue a fine mist of water into the surrounding air, and evaporation of the mist cools the air surrounding the mist droplets. Motor-driven fans can also be used with personal misting devices to help propel the cooled air stream and mist in a direction toward the user.

Conventional personal misting systems require a large fluid source from which the system can draw water to convert into mist. Some commercially-available misting systems, for example, require a user to fill a five-gallon bucket with water upon arriving at a desired location for cooling. Consequently, it is difficult (or impractical) to use such misting systems in a great deal of applications (e.g., at the beach, while camping, etc.) since one would have to haul in large amounts of water for use in remote areas. Moreover, conventional personal misting systems are not tuned or optimized to prolong usage and, therefore, typically exhaust the water supply after a short period. This requires the user to frequently replenish the fluid source. Lastly, conventional misting systems do not include sealed containers for the working fluid, which makes using such systems in dynamic environments (e.g., within a moving vehicle) infeasible.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to personal misting systems and, more particularly, to portable misting systems optimized to prolong the usage life of a working fluid.

The embodiments disclosed herein describe a misting system that is truly portable, as opposed to conventional misting systems that are bulky and require a large amount of working fluid. The misting systems described herein include manageable working fluid sources and a fluid pump and spray nozzles that are selected and sized to prolong the usage life of the working fluid. Moreover, the working fluid sources described herein may comprise sealed containers that allow a user to use the misting system in a dynamic environment, such as in the open-air cabin of a commercial vehicle or the like. One example, portable misting system includes a carrying case, a fluid pump arranged within the carrying case, and a power source arranged within the carrying case to provide electrical power to the fluid pump. A working fluid source may provide a working fluid to the fluid pump via a supply line, a distribution line may receive a pressurized working fluid from the fluid pump, and one or more spray nozzles may be coupled to the distribution line to discharge the pressurized working fluid as a mist.

Figure 1:
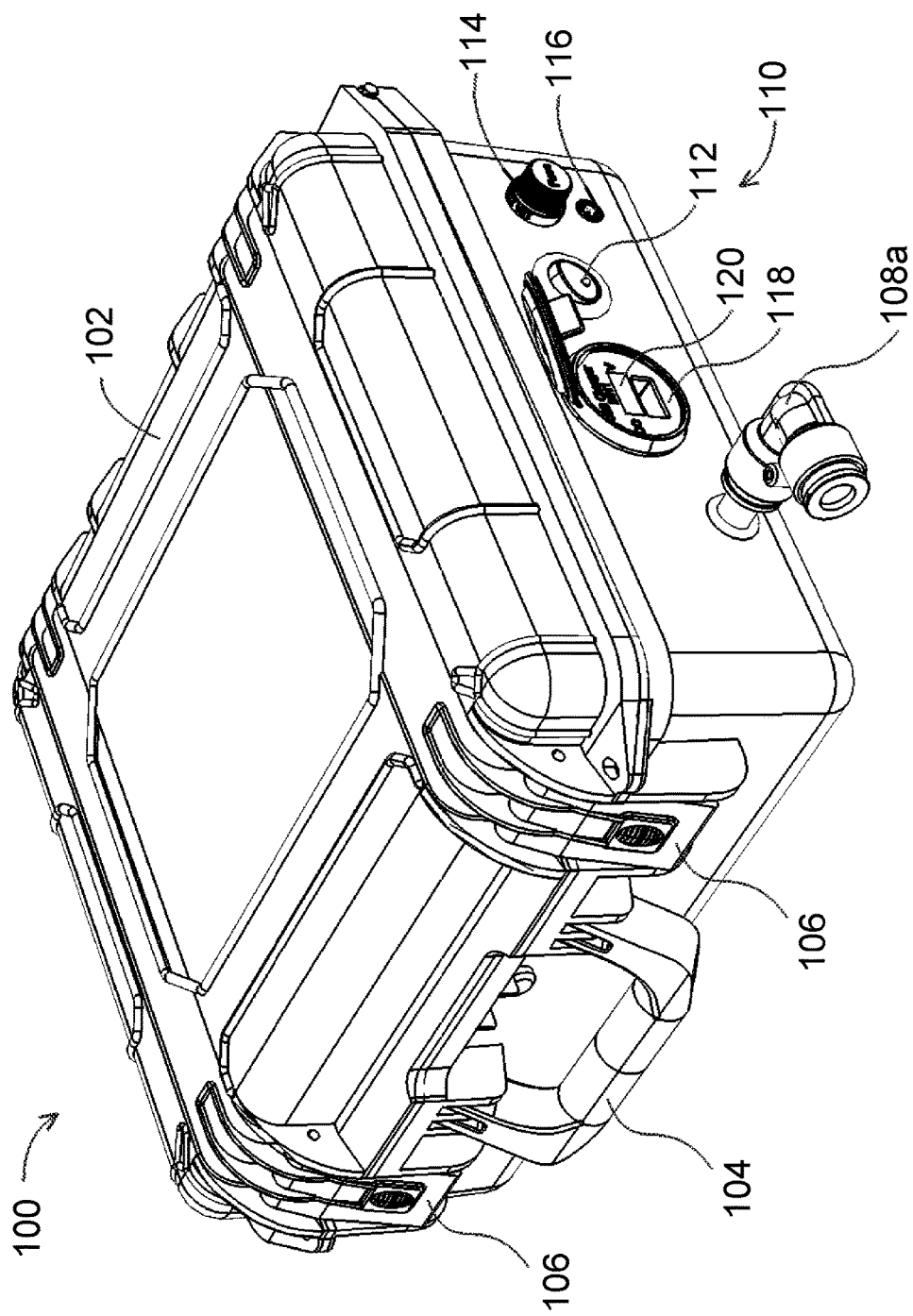
FIG. 1 depicts an example portable misting system.

FIG. 1 depicts an example portable misting system 100, according to one or more embodiments of the present disclosure. The portable misting system 100 (hereafter the "system 100") may include a carrying case 102 that allows a user to easily transport the system 100 to desired locations and deploy the system 100 for use. The carrying case 102 may comprise any rigid structure capable of accommodating (housing) some or all of the component parts of the system 100. In some embodiments, all of the component parts of the system 100 may be accommodated within the carrying case 102. In at least one embodiment, however, one or more of the component parts of the system 100 may be attached to the exterior of the carrying case 102 or otherwise transported outside of the carrying case 102, without departing from the scope of the disclosure.

In some embodiments, as illustrated, the carrying case 102 may comprise a type of clamshell storage container. In at least one embodiment, for example, the carrying case 102 may comprise a Pelican™ brand case. In one or more embodiments, the carrying case 102 may be waterproof, shock proof, and airtight. Alternatively, in at least one embodiment, the carrying case 102 may be omitted from the system 100 and the individual component parts of the system 100 may alternatively be secured to or otherwise carried by the user, without departing from the scope of the disclosure.

In some embodiments, the carrying case 102 may include a handle 104 that provides a location for a user to grip the carrying case 102. The handle 104 may comprise any device or mechanism that allows a user to carry or bear the carrying case 102. In at least one embodiment, however, the handle 104 may be omitted from the system 100 and the carrying case 102 may be transported by other means, such as on a wheeled cart or the like, without departing from the scope of the disclosure.

The carrying case 102 may also include one or more latches 106 (two shown) used to secure the carrying case 102 in a closed (shut) position. In some embodiments, however, the latches 106 may be omitted and the carrying case 102 may instead be secured in the closed position using one or more mechanical fasteners, a snap-fit engagement, an interference or friction fit, or any combination thereof. While not shown, it is also contemplated herein that the carrying case 102 further include a locking mechanism capable of locking the carrying case 102 in the closed position and thereby preventing unauthorized access to the internal contents of the carrying case 102.

The carrying case 102 may be made of a variety of rigid or semi-rigid materials. Suitable materials for the carrying case 102 include, but are not limited to, plastic, metal, hardened rubber, a composite material, wood, or any combination thereof. The size of the carrying case 102 is not limited to that shown in FIG. 1. Rather, the carrying case 102 may simply be large enough (or small enough) to accommodate (house) one or more component parts of the system 100, as discussed below. Accordingly, depending on the size or weight restrictions of the component parts of the system 100, the size of the carrying case 102 may vary to accommodate such parameters. In some embodiments, for example, the carrying case 102 may exhibit a length (from side to side) of 9 in., a width (from front to back) of 7 in., and a depth (from to top to bottom) of 4 in. It will be appreciated, however, that these dimensions may be altered to accommodate differing applications, without departing from the scope of the disclosure.

Figure 2:
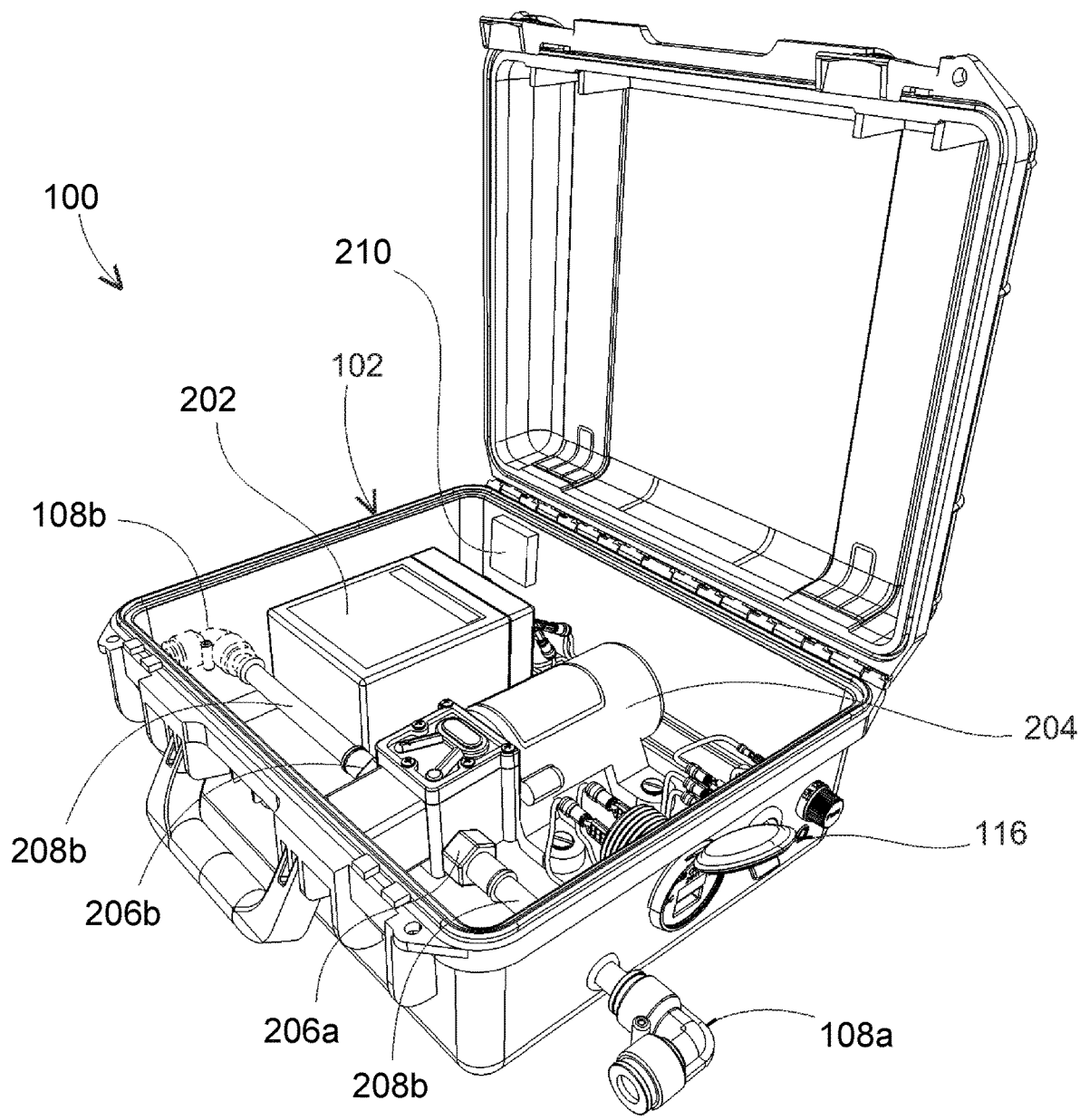
FIG. 2 shows the carrying case for the portable misting system of FIG. 1 in an open position.

In some embodiments, the carrying case 102 may also include an input connector 108a and an output connector 108b (occluded in FIG. 1, see FIG. 2). The input connector 108a provides a coupling location where a working fluid may be communicated into the carrying case 102 and, more particularly, to a fluid pump housed within the carrying case 102. The output connector 108b provides a coupling location where a pressurized working fluid may be discharged from the carrying case 102 and, more particularly, from the fluid pump.

The system 100 may further include a control panel 110 that provides a location to operate the system 100. As illustrated, the control panel 110 may be situated on a sidewall of the carrying case 102, but could alternatively be located on any other surface of the carrying case 102. In at least one embodiment, the control panel 110 may be situated entirely within the carrying case 102, thus providing a sealed enclosure that would protect the electrical components of the control panel 110.

As illustrated, the control panel 110 may include a power switch 112, a fuse holder 114, a power port 116, and a charging port 118. The power switch 112 may be operable to turn the system 100 on or off. In the illustrated embodiment, the power switch 112 comprises a rocker-type switch, but could alternatively comprise any other type or design capable of switching the system 100 on or off. The power port 116 provides a location where a user can provide electrical power to the system 100 and/or charge a battery included in the system 100. The charging port 118 may include a USB port where a user can charge an external device (e.g., phone, tablet, etc.) by connecting a USB cable. In at least one embodiment, the charging port 118 may further include a power level indicator 120, which may be configured to provide the user with a visual indicator of the remaining battery power (life) for the system 100.

FIG. 2 shows the carrying case 102 in an open position and, more particularly, shows one or more of the internal component parts of the system 100, according to one or more embodiments. As illustrated, the system 100 may include a power source 202 and a fluid pump 204 electrically coupled to the power source 202 via suitable wiring. The power source 202 may comprise any source of power (e.g., electrical, hydraulic, pneumatic, solar, etc.) to operate the fluid pump 204.

In some embodiments, as illustrated, the power source 202 may comprise one or more batteries (one shown) positioned within the carrying case 102 and configured to convey electrical power to the fluid pump 204. In at least one embodiment, the power source 202 may comprise a 12-volt, lead-acid battery, with a 2.9 amp hour rating. The rating of the battery, however, can range between about 2.0 amp hour to about 10.0 amp hour, without departing from the scope of the disclosure. In other embodiments, the power source 202 may comprise a lithium-ion battery, a fuel cell, or a capacitor.

The power source 202 may be rechargeable via the power port 116, which may be electrically connected to the power source 202 with suitable wiring and connections. A user may be able to connect an electrical line to the power port 116 to charge the power source 202, and the electrical line may terminate with an electrical plug that is connectable to a wall outlet or another location where electrical grid power may be accessed. In other embodiments, however, the power source 202 may be removable from the carrying case 102 so that it may be charged separate from the system 100.

Alternatively, or in addition thereto, the system 100 may operate on electrical power derived from the electrical grid via the power port 116. In such embodiments, the power source 202 may comprise a battery configured to operate in conjunction with the direct electrical power. For example, the system 100 may include a processor or another type of computing device programmed to switch between the battery and the electrical grid to efficiently power the system 100. Alternatively, the system 100 may be powered with the electrical grid power while simultaneously charging the battery.

In even further embodiments, the system 100 may be powered via solar power, in conjunction with electrical grid power and/or a battery. In such embodiments, the power source 202 may comprise one or more solar panels or a portable solar mat with suitable wiring configured to be electrically coupled to the fluid pump 204 (e.g., via the power port 116). Moreover, in such embodiments, the power source 202 may also include a rechargeable battery positioned within the carrying case 102 and configured to operate in conjunction with the solar panels. For example, the system 100 may switch between electrical grid power, the battery, and the solar panels as appropriate to power the system 100 or alternatively charge the battery with electrical grid power or solar power while operating the system 100.

As illustrated, the input connector 108a is communicably coupled to an input 206a to the fluid pump 204, and the output connector 108b (shown in dashed lines) is communicably coupled to an outlet 206b to the fluid pump 204. In some embodiments, as illustrated, suitable piping and connectors 208a and 208b (e.g., including brass fittings) may extend between the fluid pump 204 and the input and output connectors 108a,b, respectively. In other embodiments, however, one or both of the input and output connectors 108a,b may be directly coupled to the input and output 206a,b, respectively, without departing from the scope of the disclosure.

In the illustrated embodiment, the input and output connectors 108a,b extend through corresponding sidewalls of the carrying case 102. It will be appreciated, however, that the input and output connectors 108a,b may alternatively be positioned at any location on the carrying case 102. Moreover, in at least one embodiment, the input and output connectors 108a,b may be housed entirely within the carrying case 102, without departing from the scope of the disclosure. In such embodiments, it may be necessary for a user to open the carrying case 102 to access the input and output connectors 108a,b to assemble the system 100. Otherwise, a supply line (not shown) and a distribution line (not shown) may extend through one or more walls of the carrying case 102 to provide the system 100 with a working fluid and discharge pressurized working fluid from the system 100.

The fluid pump 204 may be any type of pumping apparatus or device configured to discharge a pressurized working fluid. In one embodiment, the fluid pump 204 may include a self-priming, 12-volt motor that provides an automatic shutoff when working fluid ceases to flow through the fluid pump 204. The fluid pump 204 may be rated and otherwise configured for operation at a variety of operating speeds and parameters. In some embodiments, for example, operating speeds of the fluid pump 204 may range between about 2.5 L/min to about 6.0 L/min and the output pressure can range between about 80 psi and about 130 psi. It will be appreciated, however, that the fluid pump 204 may be configured for operation at less than 2.5 L/min and more than 6.0 L/min, and less than 80 psi and more than 130 psi, without departing from the scope of the disclosure.

When closed, the carrying case 102 may form a sealed container (e.g., waterproof, airtight etc.) that protects the power source 202 and the fluid pump 204 from external contamination. Moreover, in at least one embodiment, the system 100 (e.g., the carrying case 102) may be classified as "intrinsically safe" and otherwise in conformance with the standards for intrinsic safety, such as developed by the International Electrotechnical Commission (IEC). As an intrinsically safe product, the system 100 is not limited solely to recreational purposes, but may also be employed in commercial applications. For example, the system 100 may be safely deployed and operated in potentially hazardous areas, such as petrochemical refineries and mines, which commonly have dangerous concentrations of flammable gases or dust. In such applications, the intrinsically safe carrying case 202 will prevent any possible sparks or catalysts from igniting surrounding flammable gases.

Moreover, in some applications, the system 100 may be installed in vehicles. For example, the system 100 may be used with commercial fleet vehicles having open-air cabins, such as U.S. Postal Service vehicles, package delivery vehicles, manufacturing or processing plant vehicles, and construction vehicles (e.g., heavy equipment). In other embodiments, the system 100 may be used with other vehicles with or without open-air cabins such as, but not limited to, a boat, a ship, a recreation vehicle (RV), a camper, etc. Vehicles having an open-air cabin rarely have functioning air conditioning systems, and the system 100 may advantageously be employed in such vehicles to help cool the air within the vehicle and the operator.

In some embodiments, the system 100 may further include a global positioning service (GPS) tracking device 210. The GPS tracking device 210 will allow a user to remotely track and locate the system 100 and thereby keep track of its usage. This may prove advantageous if the system 100 is used in a commercial context, thus enabling an employer or supervisor to keep track of the location of the system 100 or a service vehicle in which the system 100 is installed.

Figure 3:
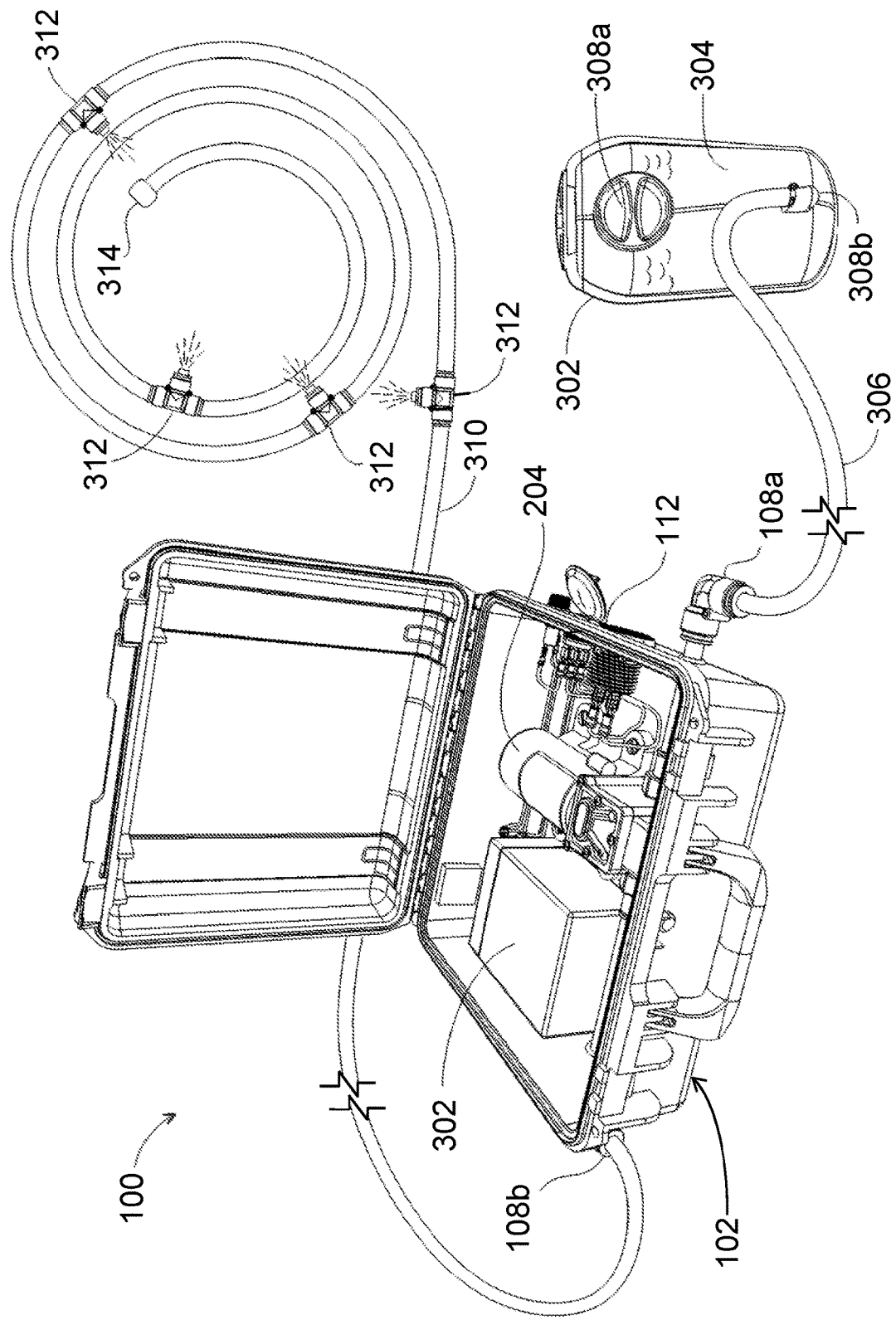
FIG. 3 depicts the portable misting system of FIG. 1 communicably coupled to a fluid source.
Figure 4:
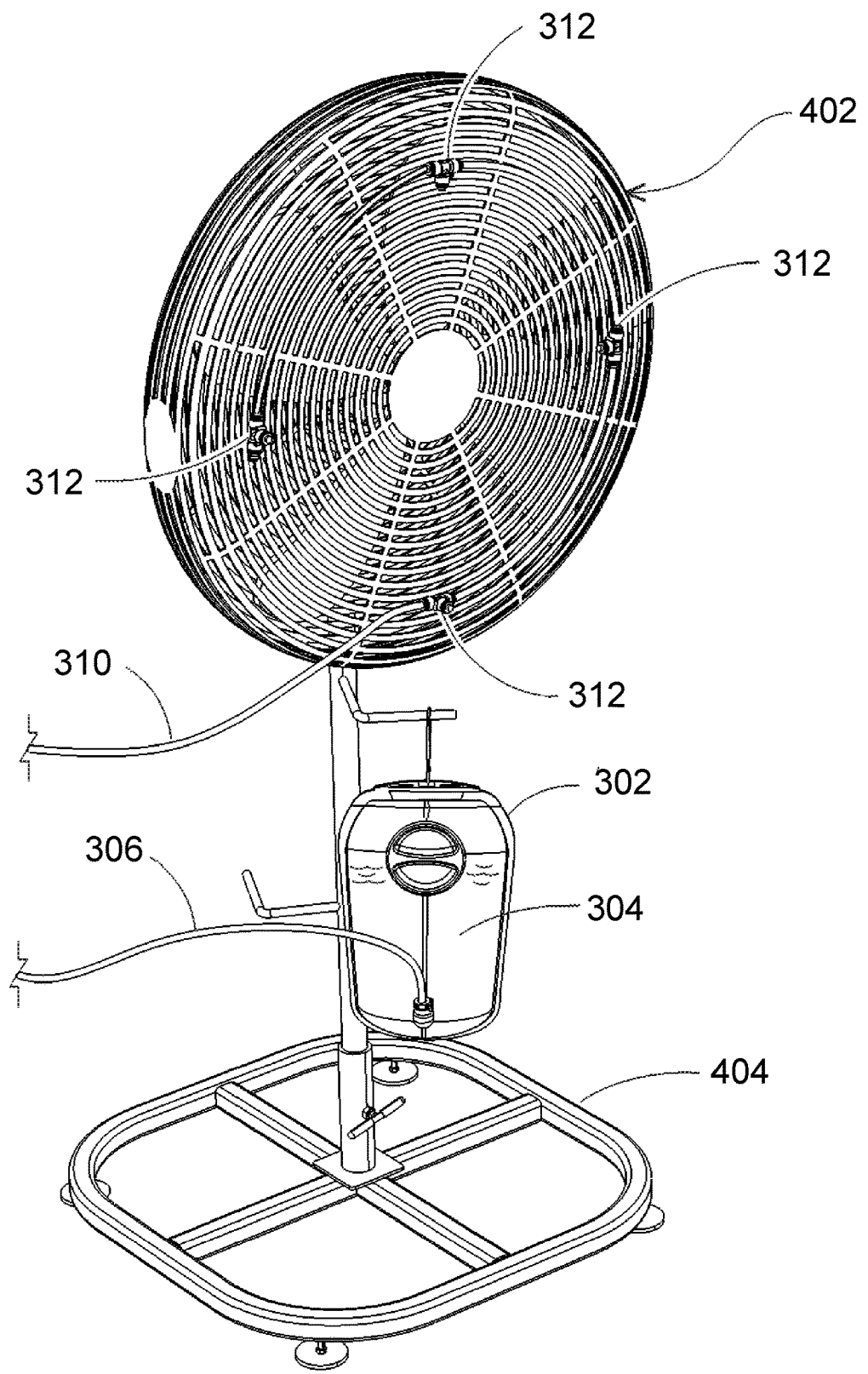
FIG. 4 depicts an alternative application of the system of FIG. 3.

FIG. 3 depicts the system 100 communicably coupled to a working fluid source 302 that contains a working fluid 304, according to one or more embodiments. The working fluid 304 may comprise any type of fluid; e.g. any liquid or gas. In some embodiments, the working fluid 304 may comprise liquid water, including both fresh and salt water. In other embodiments, the working fluid 304 may comprise a gas, such as compressed air. Moreover, it is contemplated herein that the working fluid 304 may comprise a liquid chemical mixture, such as a pesticide, without departing from the scope of the disclosure. In such embodiments, instead of being used as a personal misting system for cooling, the system 100 may provide an agricultural or landscaping application.

The working fluid source 302 may be "contained" or "non-contained." A working fluid source 302 that is "non-contained" refers to any open air or potable fluid sources. Examples of a non-contained working fluid source 302 include, but are not limited to, a body of surface water (e.g., a pool, a river, a stream, a lake, the ocean, precipitation, etc.) and a potable water source. In some embodiments utilizing a non-contained working fluid source 302, the system 100 may incorporate an inline filter configured to remove particulates or other debris that might otherwise damage system 100 components. As illustrated, a supply line 306 may extend between the input connector 108a and the working fluid source 302. In embodiments where the working fluid source 302 is non-contained, the supply line 306 may be coupled to a potable water source that provides the system 100 with a continuous stream of working fluid 304. Alternatively, the supply line 306 may extend to and be at least partially submerged in a pool, a river, a stream, a lake, the ocean, etc., and draw water into the system 100 from such bodies of surface water. In such embodiments, the supply line 306 may be or otherwise function as a common water hose.

In contrast, a working fluid source 302 that is "contained" refers to the working fluid 304 being enclosed within any rigid, semi-rigid, or flexible container. A contained working fluid source 302 may comprise any type of fluid-tight container, bag, or receptacle. In at least one embodiment, a contained working fluid source 302 may comprise a sealed container that prevents the working fluid 304 from leaking or spilling out of the working fluid source 302. This may prove advantageous in applications where the system 100 is used in a dynamic environment, such as in a commercial fleet vehicle, as discussed above. In the illustrated embodiment, the working fluid source 302 comprises a flexible bladder or bag that contains the working fluid 304. In other embodiments, the contained working fluid source 302 may comprise a bucket, a bottle, or another type of rigid or semi-rigid container. A contained working fluid source 302 may be configured to store (carry) any desired amount of the working fluid 304. In one embodiment, for example, the working fluid source 302 may be configured to store about one gallon of the working fluid, but could alternatively be configured to store more or less than one gallon, without departing from the scope of the disclosure.

In some embodiments, the contained working fluid source 302 may be coupled to or hung from an adjacent structure, which allows gravity to help feed the working fluid 304 to the inlet connector 108a via the supply line 306. In other embodiments, however, the working fluid source 302 may be placed at any location and the fluid pump 204 may draw the working fluid 304 from the working fluid source 302.

As illustrated, the working fluid source 302 may include an input location 308a and a discharge location 308b. The working fluid 304 may be added to the working fluid source 302 via the input location 308a, and may be discharged (drawn) from the working fluid source 302 via the discharge location 308b, which is fluidly coupled to the supply line 306 to convey the working fluid 304 to the input connector 108a. In the illustrated embodiment, the discharge location 308b includes a releasable connector, such as a push-lock, quick connect coupling that enables coupling of the supply line 306 and the working fluid source 302.

The input connector 108a may comprise any type of connector or coupling capable of fluidly coupling to the supply line 306. In at least one embodiment, the input connector 108a may comprise a releasable connector, such as a push-lock, quick connect coupling. The supply line 306 may comprise any type of hose or piping suitable for conveying the working fluid 304 in either pressurized or non-pressurized states. The supply line 306 may be made of a variety of materials including, but not limited to, plastic, rubber, metal, a composite material, and any combination thereof. In at least one embodiment, the supply line 306 may comprise food-grade polyurethane tubing, but could alternatively comprise a hypoallergenic plastic tubing, without departing from the scope of the disclosure.

The supply line 306 may have any desired length and any desired size necessary to optimize operation of the system 100. In one embodiment, for example, the supply line 306 may be about 5 feet long and comprise ⅜ inch tubing, but could alternatively be longer or shorter than 5 feet and comprise tubing that is smaller or larger than ⅜ inch, without departing from the scope of the disclosure.

The system 100 may further include a distribution line 310 releasably coupled to the output connector 108*b*. Similar to the input connector 108*a*, the output connector 108*b* may comprise any type of connector or coupling capable of fluidly coupling to the distribution line 310. In at least one embodiment, the output connector 108*b* comprises a releasable connector, such as a push-lock, quick connect coupling, but could alternatively comprise other types of releasable (or permanent) connectors.

The distribution line 310 may comprise any type of hose or piping suitable for conveying the working fluid 304 in a pressurized state. The distribution line 310 may be made of a variety of materials such as, but not limited to, plastic, rubber, metal, a composite material, and any combination thereof. In at least one embodiment, the distribution line 310 may comprise polyurethane, but could alternatively comprise nylon, crosslinked polyethylene (PEX), polyvinyl chloride (PVC), braided PVC, and the like, without departing from the scope of the disclosure.

One or more spray nozzles 312 (four shown) are arranged along the length of the distribution line 310 and configured to eject (discharge) the working fluid 304 into the surrounding environment as a mist (i.e., fine droplets). The spray nozzles 312 may be equidistantly or randomly spaced from each other along the length of the distribution line 310. While only four spray nozzles 312 are shown in FIG. 3, more or less than four may be included in the system 100, without departing from the scope of the disclosure. The distribution line 310 may have any desired length to accommodate as many spray nozzles 312 as needed for a particular misting application. In some embodiments, for example, the spray nozzles 312 may be positioned about every five feet along the length of the distribution line 310. As will be appreciated, the spacing between adjacent spray nozzles 312 may vary depending on the needs of the user or the application.

The distribution line 310 may also exhibit any desired size. In some embodiments, for example, the distribution line 310 may comprise ⅜ inch tubing, but could alternatively comprise tubing smaller or larger than ⅜ inch, without departing from the scope of the disclosure. In at least one embodiment, for example, the distribution line 310 may comprise ¼ inch tubing.

In some embodiments, the spray nozzles 312 may exhibit or otherwise define an orifice size ranging from about 0.15 mm to about 0.30 mm. In other embodiments, however, the orifice size may be less than 0.15 mm or greater than 0.30 mm, without departing from the scope of the disclosure. A preferred range for orifice size is about 0.15 mm to about 0.20 mm. An orifice size of 0.15 mm or lower generates a fine mist that becomes suspended in the surrounding air, and the air cools as the fine mist evaporates.

Conventional personal misting systems commonly include orifice sizes of 0.30 mm and greater and thereby generate mist with larger droplets that quickly coalesce and fall under the force of gravity. This can result in the rapid accumulation of the working fluid 304 on adjacent surfaces and users, which causes pooling and saturation instead of a cooling effect. Moreover, an orifice size of 0.3 mm or greater reduces the efficiency of a personal misting system by discharging excessive and unnecessary amounts of the working fluid 304. Misting systems having orifice sizes greater than 0.3 mm, for example, are capable of exhausting a five gallon bucket of water after operating for a half hour to an hour. In contrast, embodiments of the presently described system 100 including four or less spray nozzles 312 having an orifice size between about 0.15 mm and about 0.20 mm may be able to provide at least one hour and ten minutes of misting per gallon of working fluid 304 drawn from the working fluid source 302.

In some embodiments, a pressure valve 314 (not shown) may be coupled to and otherwise arranged in the distribution line 310, such as at the end of the distribution line 310. The pressure valve 314 may comprise a bleed-off valve configured to bleed off any residual air residing in the distribution line 310 prior to normal misting operation of the system 100.

With continued reference to FIG. 3, example operation of the system 100 is now provided. The system 100 may be transported to a desired location using the carrying case 102. In some embodiments, one or more of the working fluid source 302, the supply line 306, and the distribution line 310 may be accommodated (positioned) within the interior of the carrying case 102 during transport and removed from the carrying case 102 when the system 100 is ready to be set up for use. In other embodiments, one or more of the working fluid source 302, the supply line 306, and the distribution line 310 may instead be removably attached to the exterior of the carrying case 102 for transporting the system 100, without departing from the scope of the disclosure.

Once the system 100 is set up for use, the system 100 may be turned on by flipping the power switch 112. In other embodiments, however, the system 100 may be turned on remotely. In such embodiments, the system 100 may include wireless communication means capable of communicating with a wireless communicator, such as a smartphone or a tablet. While not shown, it is also contemplated herein that the system 100 further include one or more speakers also operable via wireless communication means, such as Bluetooth™. In such embodiments, the speaker(s) may be operated via a handheld device.

Turning on the system 100 will supply power (e.g., electrical power) to the fluid pump 204 (FIG. 2) from the power source 302. Once turned on, the fluid pump 204 begins to draw in the working fluid 304 from the working fluid source 302 via the supply line 306. The fluid pump 204 will receive the working fluid 304 via the inlet connector 108*a* and convey a pressurized working fluid 304 into the distribution line 310 via the outlet connector 108*b*. If included in the system 100, the pressure valve 314 may be manually or automatically actuated (triggered) to bleed off any residual air present in the distribution line 310. Once the residual air is sufficiently discharged from the distribution line 310, the pressure valve 314 may be closed and the pressurized working fluid 304 may then be ejected or discharged from the distribution line 310 via the spray nozzles 312.

In embodiments where the working fluid 304 is water, the spray nozzles 312 will issue a fine mist of water, the evaporation of which cools the air surrounding the mist droplets. In some embodiments, the distribution line 310 may be strategically placed (e.g., hung) on a structure to help cool the area (air) surrounding the structure. The structure can include, but is not limited to, a pavilion, a porch, a tent (e.g., a canopy tent), a beach umbrella, etc.

The system 100 may be tuned and otherwise optimized to utilize the working fluid 304 efficiently, and thereby prolong the usage life of the working fluid 304 contained within the working fluid source 302. In some embodiments, for example, the size and rating of the fluid pump 204 and the spray nozzles 312 may be selected to prolong usage of the working fluid 304. More specifically, the spray nozzles 312 may be selected with minimally sized orifices that require a minimal amount of pressure for operation, which would prolong the supply of the working fluid 304. Moreover, the fluid pump 204 may be selected with a pump rate corresponding to the selected spray nozzles 312 to prolong the supply of the working fluid 304.

In embodiments where the working fluid 304 is a liquid chemical mixture, such as a pesticide, the spray nozzles 312 will issue a fine mist of the liquid chemical mixture, which may help treat a surrounding area for insects, rodents, or other pests. In such embodiments, the distribution line 310 may be strategically placed around a structure or area requiring pest control, such as a home, a garden, or another area requiring pesticide.

FIG. 4 is another embodiment and alternative application of the system 100, according to one or more additional embodiments. As illustrated, a portion of the distribution line 310 may be coupled to a fan 402 or another device configured to move (push) air. In some embodiments, as illustrated, the working fluid source 302 may be coupled to or hung from a stand 404, such as the stand that supports the fan 402. Gravity may help feed the working fluid 304 through the supply line 306, otherwise the fluid pump 204 (FIGS. 2-3) may draw the working fluid 304 from the working fluid source 302 and through the supply line 306.

The distribution line 310 may be permanently or removably attached to the fan 402 for operation. The distribution line 310 may be attached to the fan 402 via a variety of attachment means including, but not limited to, a magnetic attachment, one or more mechanical fasteners (e.g., clips, screws, bolts, pins, zip ties, etc.), a snap fit engagement, a welded engagement, an adhesive attachment, and any combination thereof.

In the illustrated embodiment, the distribution line 310 is formed into a generally circular shape and attached about the outer periphery of the fan 402. In other embodiments, the distribution line 310 may be coupled to the fan 402 in other geometric shapes and at other locations relative to the fan 402, without departing from the scope of the disclosure. Moreover, in some embodiments, the distribution line 310 may form two or more concentric circles on the face of the fan 402. While only four spray nozzles 312 are depicted, more or less than four may be utilized in the depicted embodiment. In operation, the spray nozzles 312 will issue mist and the fan 402 will propel the cooled air stream in a desired direction.

Embodiments Disclosed Herein Include

A. A portable misting system that includes a carrying case, a fluid pump arranged within the carrying case, a power source arranged within the carrying case to provide electrical power to the fluid pump, a working fluid source that provides a working fluid to the fluid pump via a supply line, a distribution line that receives a pressurized working fluid from the fluid pump, and one or more spray nozzles coupled to the distribution line to discharge the pressurized working fluid as a mist.

B. A method that includes turning on a portable misting system that includes a carrying case, a fluid pump arranged within the carrying case, and power source arranged within the carrying case to provide electrical power to the fluid pump, flowing a working fluid from a working fluid source to the fluid pump via a supply line, pressurizing the working fluid in the fluid pump and discharging a pressurized working fluid from the fluid pump into a distribution line, and discharging the pressurized working fluid as a mist from one or more spray nozzles coupled to the distribution line.

Each of embodiments A and B may have one or more of the following additional elements in any combination: Element 1: wherein the fluid pump, the power source, the working fluid source, the supply line, and the distribution line are each contained within the carrying case until deployment for use. Element 2: wherein the power source is selected from the group consisting of a rechargeable battery, a fuel cell, a capacitor, and any combination thereof. Element 3: wherein the power source operates in conjunction with at least one of electrical grid power and solar power. Element 4: wherein the carrying case is waterproof and airtight. Element 5: wherein the carrying case is intrinsically safe. Element 6: wherein the working fluid comprises a fluid selected from the group consisting of water, air, a liquid chemical mixture, and any combination thereof. Element 7: wherein the working fluid source comprises a rigid, semi-rigid, or flexible container that stores the working fluid. Element 8: wherein the container is sealed to prevent the working fluid from leaking or spilling during use. Element 9: wherein the working fluid source comprises a potable water source or a body of surface water. Element 10: wherein the one or more spray nozzles exhibit an orifice size ranging between 0.15 mm and 0.30 mm.

Element 11: wherein the distribution line is attached to a fan.

Element 12: wherein turning on the portable misting system is preceded by transporting the portable misting system to a desired location, and accommodating the fluid pump, the power source, the working fluid source, the supply line, and the distribution line within the carrying case while transporting the portable misting system. Element 13: wherein the carrying case is intrinsically safe and the method further comprises operating the portable misting system in a hazardous area with flammable gases or dust. Element 14: wherein the working fluid source comprises a rigid, a semi-rigid, or a flexible container that stores the working fluid, the method further comprising sealing the container and thereby preventing the working fluid from leaking or spilling during use. Element 15: further comprising attaching the distribution line to a fan, and propelling the mist in a desired direction with the fan. Element 16: wherein the working fluid is water and the method further comprises cooling an area adjacent the one or more spray nozzles with the mist. Element 17: wherein the working fluid is a liquid chemical mixture forming a pesticide, the method further comprising discharging the mist from the one or more spray nozzles to treat an area for pest control. Element 18: further comprising discharging the mist from the one or more spray nozzles at a rate of one gallon per one hour and ten minutes.

By way of non-limiting example, exemplary combinations applicable to A and B include: Element 2 with Element 3; Element 4 with Element 5; and Element 7 with Element 8.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A portable misting system, comprising:
   a carrying case that is waterproof and airtight;
   a fluid pump positioned inside the carrying case;
   a power source positioned inside the carrying case to provide electrical power to the fluid pump;
   a working fluid source located outside the carrying case and providing a working fluid to the fluid pump via a supply line;
   a distribution line that receives a pressurized working fluid from the fluid pump; and
   one or more spray nozzles coupled to the distribution line to discharge the pressurized working fluid as a mist,
   wherein the fluid pump, the power source, the working fluid source, the supply line, and the distribution line are each contained within the carrying case until deployment for use.

2. The portable misting system of claim 1, wherein the power source is selected from the group consisting of a rechargeable battery, a fuel cell, a capacitor, and any combination thereof.

3. The portable misting system of claim 2, wherein the power source operates in conjunction with at least one of electrical grid power and solar power.

4. The portable misting system of claim 1, wherein the carrying case is intrinsically safe.

5. The portable misting system of claim 1, wherein the working fluid comprises a fluid selected from the group consisting of water, air, a liquid chemical mixture, and any combination thereof.

6. The portable misting system of claim 1, wherein the working fluid source comprises a rigid, semi-rigid, or flexible container that stores the working fluid.

7. The portable misting system of claim 6, wherein the rigid, semi-rigid, or flexible container is sealed to prevent the working fluid from leaking or spilling during use.

8. The portable misting system of claim 1, wherein the working fluid source comprises a potable water source or a body of surface water.

9. The portable misting system of claim 1, wherein the one or more spray nozzles exhibit an orifice size ranging between 0.15 mm and 0.30 mm.

10. The portable misting system of claim 1, wherein the distribution line is attached to a fan.

11. The portable misting system of claim 1, further comprising input and output connectors located outside the carrying case and in fluid communication with the fluid pump, wherein the supply line is releasably coupled to the input connector and the distribution line is releasably coupled to the output connector.

12. A method, comprising:
   transporting a portable misting system to a desired location, the portable misting system including:
      a carrying case that is waterproof and airtight;
      a fluid pump positioned inside the carrying case; and
      a power source positioned inside the carrying case to provide electrical power to the fluid pump;
   turning on the portable misting system and thereby flowing a working fluid from a working fluid source to the fluid pump via a supply line;
   pressurizing the working fluid in the fluid pump and discharging the pressurized working fluid from the fluid pump into a distribution line;
   discharging the pressurized working fluid as a mist from one or more spray nozzles coupled to the distribution line;
   accommodating the fluid pump, the power source, the working fluid source, the supply line, and the distribution line within the carrying case while transporting the portable misting system.

13. The method of claim 12, wherein the carrying case is intrinsically safe and the method further comprises operating the portable misting system in a hazardous area with flammable gases or dust.

14. The method of claim 12, wherein the working fluid source comprises a rigid, a semi-rigid, or a flexible container that stores the working fluid, the method further comprising sealing the rigid, semi-rigid, or flexible container and thereby preventing the working fluid from leaking or spilling during use.

15. The method of claim 12, further comprising:
   attaching the distribution line to a fan; and
   propelling the mist in a desired direction with the fan.

16. The method of claim 12, wherein the working fluid is water and the method further comprises cooling an area adjacent the one or more spray nozzles with the mist.

17. The method of claim 12, wherein the working fluid is a liquid chemical mixture forming a pesticide, the method further comprising discharging the mist from the one or more spray nozzles to treat an area for pest control.

18. The method of claim 12, further comprising discharging the mist from the one or more spray nozzles at a rate of one gallon per one hour and ten minutes.

* * * * *